United States Patent
Baur et al.

[11] Patent Number: 5,823,318
[45] Date of Patent: Oct. 20, 1998

[54] SLICE STACKER PARTICULARLY FOR CHEESE SLICES

[75] Inventors: Wilhelm Baur, Gestratz; Andreas Kierok, Lindenberg; Timo Steinbauer, Lindenberg; Franz Hartmann, Weiler/Simmerberg; Herbert Adler, Lindenberg; Oskar Milz, Heimenkirch; Roland Zeuschner, Argenbühl; Günter Honsberg, Wangen, all of Germany

[73] Assignee: Natec, Reich, Summer GmbH & Co. KG, Germany

[21] Appl. No.: 741,653

[22] Filed: Oct. 31, 1996

[30] Foreign Application Priority Data

Feb. 10, 1996 [DE] Germany ............... 196 04 926.1

[51] Int. Cl.$^6$ ................................ B65G 15/20
[52] U.S. Cl. ............... 198/699.1; 198/408; 198/726; 414/798.2
[58] Field of Search ............... 414/798.2, 798.5, 414/798.6, 798.7, 754; 198/408, 719, 726, 699.1, 419.1

[56] References Cited

U.S. PATENT DOCUMENTS

| 1,807,312 | 5/1931 | Henley, Jr. ............ | 198/726 |
|---|---|---|---|
| 2,925,926 | 2/1960 | Packman et al. ............ | 414/798.2 |
| 3,180,481 | 4/1965 | Brause ............ | 198/604 |
| 3,288,266 | 11/1966 | Bradley ............ | 198/408 |
| 3,662,875 | 5/1972 | Salomon ............ | 414/798.5 |
| 3,675,792 | 7/1972 | Griner et al. ............ | 414/798.5 |
| 3,731,789 | 5/1973 | Fleischhauer ............ | 198/699.1 |
| 3,850,314 | 11/1974 | Runyan et al. ............ | 414/799 |
| 3,895,982 | 7/1975 | Persson ............ | 198/699.1 |
| 3,904,077 | 9/1975 | Luginbuhl ............ | 414/798.5 |
| 4,103,786 | 8/1978 | Tokuno ............ | 214/7 |
| 4,141,193 | 2/1979 | Joa ............ | 198/408 |
| 4,176,993 | 12/1979 | Luginbuhl ............ | 414/798.6 |
| 4,194,343 | 3/1980 | Myers et al. ............ | 198/604 |
| 4,255,584 | 3/1981 | Fakler ............ | 83/94 |
| 4,304,326 | 12/1981 | Fowler ............ | 198/604 |
| 4,394,899 | 7/1983 | Fluck ............ | 198/408 |
| 4,676,050 | 6/1987 | Odenthal ............ | 53/447 |
| 5,176,244 | 1/1993 | Radzins et al. ............ | 414/798.7 |
| 5,331,874 | 7/1994 | Foster et al. ............ | 198/626.6 |
| 5,687,833 | 11/1997 | Dalessio, Jr. et al. ............ | 198/786 |

FOREIGN PATENT DOCUMENTS

| 2490601 | 3/1982 | France ............ | 198/408 |
|---|---|---|---|
| 1970462 | 10/1967 | Germany . | |
| 8709053 | 10/1987 | Germany . | |
| 339560 | 8/1959 | Switzerland . | |

Primary Examiner—Karen M. Young
Assistant Examiner—Douglas Hess
Attorney, Agent, or Firm—Brown, Martin, Haller & McClain, LLP

[57] ABSTRACT

This innovation describes a slice stacker, designed in particular for cheese slices and other slice-shaped objects, consisting of a brush belt with resting overhead or lower shot belts, which register slices from the top or from the bottom.

18 Claims, 5 Drawing Sheets

SLICE STACKER PARTICULARLY FOR CHEESE SLICES

BACKGROUND OF THE INVENTION

The innovation pertains to a slice stacker, in particular for cheese slices and similar slice-shaped objects according to the governing principal of patent claim 1.

Slice-shaped objects of this type may be for example disks, card board strips, compact sausage slices or other food products which have a certain mechanical flexibility.

The innovation is based on the technical development described in GM 87 09 053.8.

The sample shows a slice stacker which consists of two parallel running brush belts with some distance between them, where the brush belts form a transport area.

From the feed side a cheese slice will be registered between the bristles of the brush belts which are located across from one another. There it comes to a halt at a designated vertical stop rail.

Registering a horizontal resting slice between the brushes, which are standing up and with belts located across from one another, has the disadvantage, that while exiting the shot belt and prior to the slice entering between the brushes, the slice has a certain ballistic trajectory which cannot be calculated exactly.

The trajectory depends on several parameters. For example the weight of the slice, the speed of the slice, the mechanical pliability of the slice and other parameters. Therefore it has not been achieved as of yet, to precisely designate the feed into the brush belt of such a slice.

The latest technical development has the disadvantage, that the slice cannot be fed precisely between the brushes of the brush belt and therefore it may tilt, slide off to its side, or may even fall out of the brush belt altogether.

SUMMARY OF THE INVENTION

The purpose of this innovation is however, to develop a slice stacker of the previously mentioned kind, which feeds a slice into the brush belt with much improved accuracy and the slice will be positioned at a defined position at the brush belt.

The solution of this task will be accomplished by the technical model of claim 1.

A significant feature of this innovation is the fact that the brush belt is positioned in a resting position and that the slices are being fed from the top or from the bottom, through the proper shot belt into the resting brush belt.

The significant advantage of this presented technical model is that due to the slices being fed vertically from at least one upper or lower shot belt, an accurate position between the bristles of the brush belts can be achieved.

Instead of an individual brush belt located on top and on the bottom, there may be several brush belts of this type arranged on the top and/or on the bottom.

Therefore, a ballistic trajectory is being avoided, since the slices in the horizontal position are not being fed in a way that they may bend or get deformed, ending up without definition. However, according to this innovation the slice is being fed between the bristle and the bristle belt in direction of gravity.

It is preferred that when the shot belt is located near the brush belt, that the slice is partially still supported by the shot belt and when leaving the shot belt it is already flowing over into the brushes of the brush belt where it is being defined.

The bristles of the brush belt will cause a breaking action to the fed slice and the slice then, will land on its lower seal edge at a working surface and will be supported through the seal seam in a spring-back fashion.

Tests have proven, that due to gravitational forces, the slice which is being fed through the bristles by the speed of the shot belt will then be slowed down and bounced back, and will then land with its lower seal seam on the working surface. Once there, it will jump upward, due to the elastic shaping of the seal seam, and will land on the working surface with its seal seam stretched.

This way, slices are being transported upright and are being fed into the brush belt with some distance between them and are being supported from both sides by the brushes.

When the bristles of the brush belt have a high density it is possible to pack the slices very close together on the brush band, because in principle, the brush belt has to only be moved by the width of an individual slice in the transport direction in order to immediately feed the next slice.

The advantage hereby is that the brush band can be packed very tightly with slices that need to be transported.

The result is a high packaging capacity in the area of the brush belt.

The shot belt for example travels at a speed of 2 meters per second, while the brush band travels at a speed of 0.10 meters per second.

Purpose of the aforementioned brush belt is that at first the individual slices are being fed through the individual bristles of the brush belt in order to create a stack as quickly as possible.

It is intended that in the outlet area of the brush belt—which is kept rather short—the stacking takes place.

During this process of stacking in the area of the brush belt and for the transport of the stack, a special protection is required, independent from the type and the arrangement of the brush belt.

It is essential that the stacking in the outlet area of the brush belt occurs when the slices are lined up in the bristles of the brush belt and when slices having some space between them, run up against a stop which is located within the transport area. This stop is not permanent, but is designed as a stop face in the area of the turnstile. This way the slices run in an upright position toward this vertically positioned stop face and back-up to a stack. A stack may consist for example of 10 to 25 slices. When the stacking process is completed the entire turnstile will turn for example by 90° and the upright stack will then be tilted and will reach the outlet area of an additional transport conveyor, from where the resting stack will be forwarded to an additional conveyor.

It is advantageous to install a stopping device with a sensor in the area of the brush belt, preferably in the form of a photo-electric cell or a light barrier, which prevent slices that are not part of a specific stack any longer, from still entering at the top of the stacking unit.

It is advantageous that the turnstile for example has four stop faces which have some space in between each other and the turnstile will then turn in four steps in order to assure a high stacking capability. This way, a very short processing distance from the upright stack to the resting stack is assured. The advantage is that due to this short processing distance the individual slices within each stack do not slide or fall out.

Of course, a turnstile change for various heights of stacks is provided/possible.

The entire unit has the advantage that it is built very compact and it takes up very little space, because as already mentioned, the brush belt is 350 mm long, while the stack-turn unit has a diameter of 135 mm.

Trademarks of the invented subject matter of the presented innovation do not only apply to the individual trademark, but also to other trademarks pertaining to this project.

All information and features disclosed in these documents, including the summary, and especially the dimensional development depicted in the drawings are considered essential to the invention as far as they are new individually or as a combination compared to the latest technical developments.

BRIEF DESCRIPTION OF THE DRAWINGS

The following drawings reflect only one particular type of innovation which is described closely. The drawings and their descriptions disclose additional features that are unique features and advantages of the new invention.

DESCRIPTION OF THE PREFERRED EMBODIMENT

Figure 1:
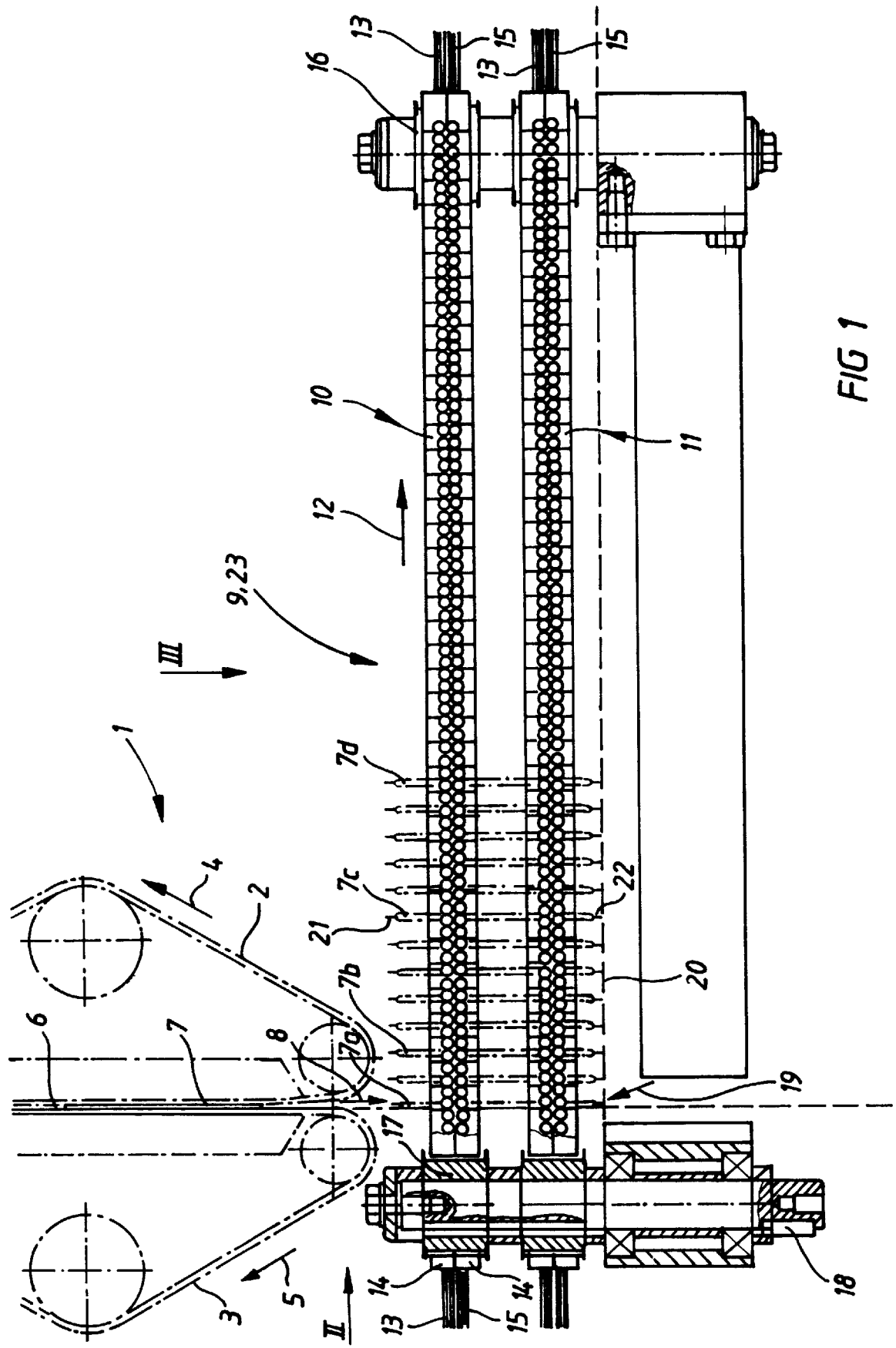
FIG. 1 is a schematic side view of the transport unit, according to the present invention.

FIG. 1 schematically shows a shot belt 1 which essentially consists of two transport belts 2,3 which are working in opposite directions and which are driven in direction of arrows 4,5.

The transport belts 2,3 form a small transport gap 6, in which the slice 7 will be transported downward in direction of arrow 8.

Due to the high speed of the transport belts 2,3, the slice which is located in the transport gap 6 will be shot in the direction of arrow 8, in between the bristles of the transport unit which is positioned below.

The example shows that the transport unit 9, consists of deflection rollers 16,17, located on the left and on the right. A brush belt 23,24 in the form of a continuous belt runs and drives the deflection rollers 16,17.

An explanation of the construction of each brush belt 23,24 is only necessary once since the other brush belt and its drive is identical.

Figure 2:
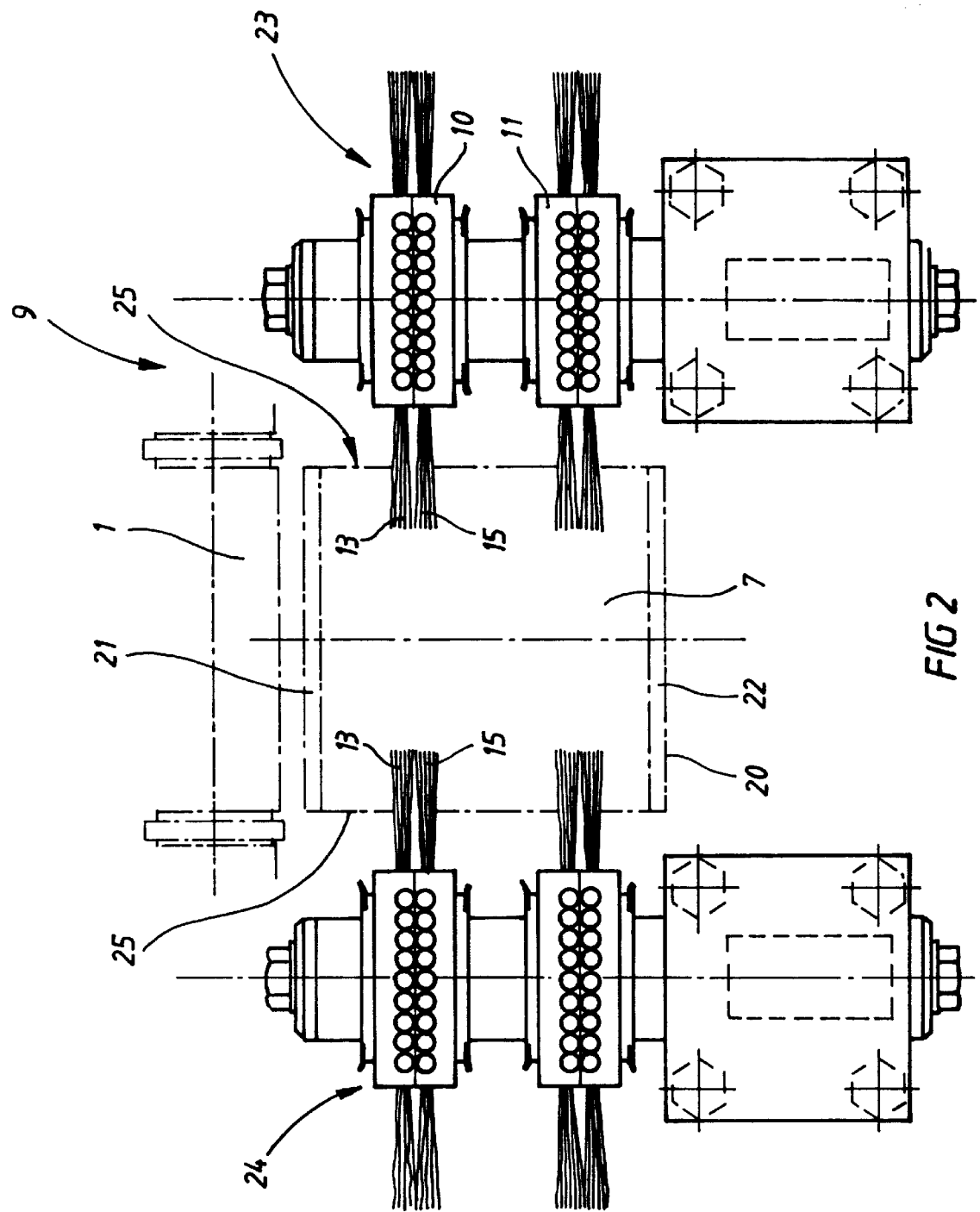
FIG. 2 is a front view of the transport unit in the direction of arrow II in FIG. 1.

Each brush belt 23,24, consists as shown in FIG. 1 and 2 of an upper brush belt 10 and a lower brush belt 11.

Both brush belts are constructed of synthetic material to form a toothed belt. Stop blocks 14 are attached to the outer surface of each belt, as illustrated in FIG. 1 and the stop blocks form a mount for the bristles 13,15. The fasteners securing the stop blocks are not depicted in detail.

Each stop block 14 takes on a bristle packet 13 as well as 15 and the stop blocks 14 are arranged as a set, vertically one above the other, so that there are bristle packets 13,15 being formed, which are arranged in a set vertically above one another. To save costs, the brush belts 23,24 are divided into the upper and lower brush belts 10,11.

In other versions, the equipment may have a continuous brush belt versus the divided brush belts 23,24 (consisting of upper and lower brush belts 10,11).

The bristles 13,15 are preferably made of synthetic material.

The brush belts 23,24 are driven in direction of arrow 12, where the drive is activated by a driving axle 18, which is admitted by a drive and which is not described any further.

FIG. 1 shows that a rejection hatch 19 is located at position 19. This rejection hatch 19 is located at the bottom of a stop face 20, which is located across from the transport gap 6 of the shot belt, and which rotates at its rotational axis 26.

The rejection hatch 19 may be opened through a corresponding control when faulty material enters the transport unit 9 through the shot belt 1.

Otherwise, the slices 7 are being transported at high speed in direction of arrow 8, between the bristles 13,15 of the brush belts 23,24, and where they come to a stop. Here they hit against the bottom of the working surface 20 with their lower seal seam 22. They spring back slightly and align themselves between the bristles 13,15.

The upper seal seams 21 are projected above the upper brush belt 10.

It is not depicted in the continuation of the process (in direction of transport 12) that there are upper guide rails which make all slices 7 fully rest in an upright position and on their lower seal seams 22 on the working surface. It is also not depicted that there are vertical guide surfaces present on the side, which center the slices 7 approximately between the bristles 13,15, according to FIG. 2. These guide areas are indicated in the shape of the side guide 25 in FIG. 2.

In a further development of this innovation it may be possible to install a stopping device 31 in the area of the brush belt 23,24, which prevents that slices still reach the stacking unit that follows and which are not part of a specific stack 33.

Figure 3:
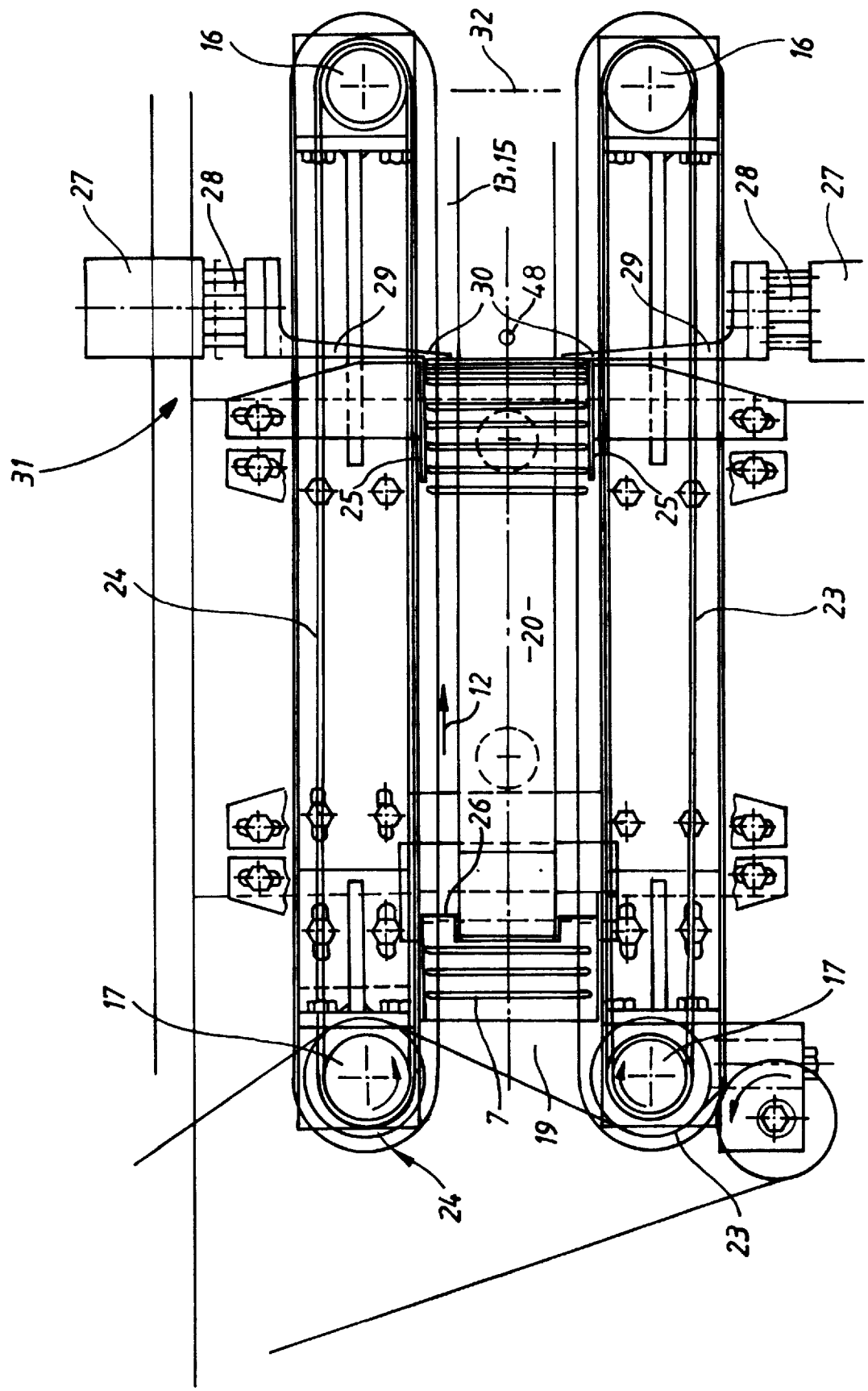
FIG. 3 is a top view of the transport unit in the direction of arrow III in FIG. 1.

FIG. 3 shows a sensor 48, located in the area of the stopping device 31, preferably a light barrier or photo-electric cell.

This stopping device 31 consists mainly of two pneumatic cylinders 27 which are positioned symmetrically across from one another. Each of these pneumatic cylinders 27 drives an adjoining piston rod 28. This piston rod 28 is connected with a stop rail 29 which consists of three different fingers 30. These fingers 30 are located parallel and with some distance from one another, where the lowest finger 30 is located below the lowest row of bristles of the lower brush belt 11, the middle finger 30 is located between brush belts 10 and 11 and the upper finger 30 is located above the upper brush belt 10 and presses itself on the side of the respective slice 7.

This is reflected in FIG. 3 where the fingers 30 press themselves against the side and where only the upper finger is visible.

In doing so, the fingers 30 are in a straight engagement position. This means they pile up the slices which have been transported by the brush belt in direction of arrow 12. This way no more than two to three slices arrive at the stop rails 29. They will then be forwarded in direction of arrow 12, after pulling back off the stop rails 29 from the transport area of the transport unit 9, until they reach position 32 in the area of the stacking unit 38.

Figure 4:
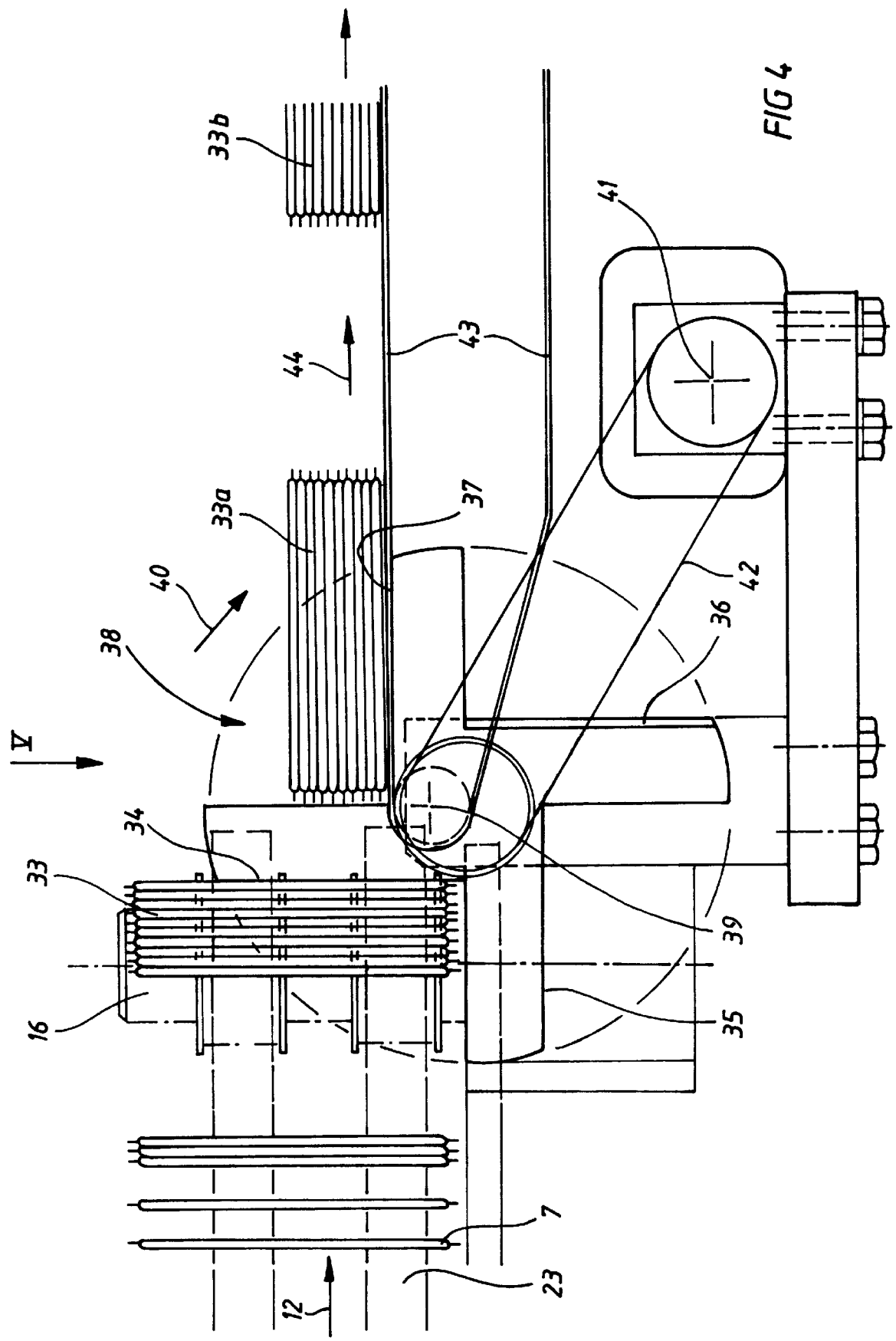
FIG. 4 is a side view of the stacking unit.
Figure 5:
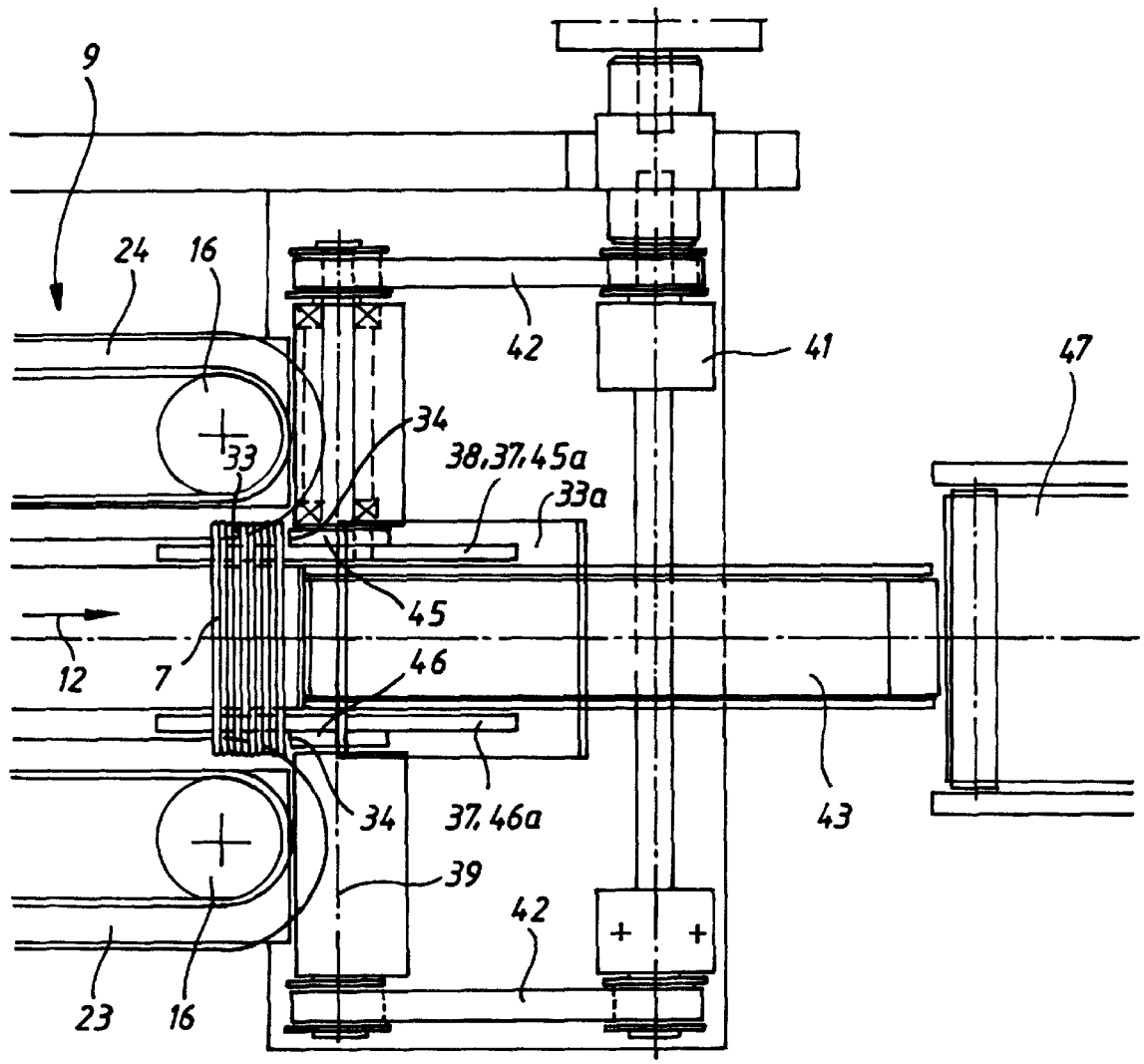
FIG. 5 is a top view of the stacking unit in the direction of arrow V in FIG. 4.

The stacking unit 38 is described further in FIGS. 4 and 5.

It is now recognized that the slices 7 are running against the stop face 34 in direction of arrow 12 where they are being piled up.

It is hereby important, that several stop faces 34,35,36,37 are positioned evenly at the circumference of the turnstile and that the turnstile consists of individual fingers 45,46, which form the respective stop faces 34–37.

A stack of slices 33 for example is being formed at the stop face 34 which is defined by fingers 45,46.

Additional fingers 45*a*, 46*a* are positioned at a displaced angle of 90°, which defines stop face 37.

The entire turnstile may be driven step by step in its rotational axis 39. The drive 41 has sets of belts 42 which drive the turnstile through a corresponding deflection roller, in direction of arrow 40.

As shown in the example in FIG. 4, the slices 7 form a stack 33, by being piled up at the stop face 34. As soon as the stack has the required number of slices, the turnstile is turned by 90° in direction of arrow 40, so that the upright stack 33 can be moved to the resting stack 33*a*. This way, the resting stack of slices 33*a* is moved to a transport conveyor 43 and transported in direction of arrow 44.

It is important now, that when the upright stack 33 is transported by turning the turnstile in direction of arrow 40 to the resting stack, that there are no further slices being transported in direction of arrow 12 against the stacking unit 38. This is the purpose of the stopping device 31 as previously described. In this small space, the stopping device retains the transported slices 7 in the transport area of the transport unit, by engaging its stop rails 29.

As previously described, the turnstile consists mainly of fingers 45,46 or 45*a*, 46*a*, which are positioned at the perimeter and displaced by 90° from one another.

Of course the turnstile is not limited to this type of construction. For example, it may have only two stop faces positioned across from one another which are displaced in an angle of 180° from one another.

The fingers 45,45*a* or 46,46*a* as described are then being moved past the transport conveyor.

It is also possible to equip the conveyor 43 with individual transport belts and to guide the fingers 45, 46 between these belts and then through these belts around the outside of conveyor 43, as shown in our example.

The stack 33*b* which has been formed at conveyor 43 will then be moved to a packaging machine where the wrapping and sealing of the stack will take place.

Transport conveyor 47 is provided for this purpose.

Although a preferred embodiment of the invention has been described above by way of example only, it will be understood by those skilled in the field that modifications may be made to the disclosed embodiment without departing from the scope of the invention, which is defined by the appended claims.

We claim:

1. A slice stacking apparatus for stacking cheese slices and other slice-shaped objects, the apparatus comprising:
   at least one pair of opposing, horizontally oriented brush belts, each opposing belt comprising an upper and a lower brush belt, the belts running parallel to one another and being spaced apart to form a horizontal transport area having an inlet end and an outlet end;
   each brush belt having a plurality of spaced packets of bristles projecting laterally into said transport area and opposing the bristle packets of the other brush belt to support spaced, vertically oriented slice-shaped objects along the horizontal transport area between adjacent pairs of opposing bristle packets; and
   a vertically oriented shot belt assembly positioned at the inlet end of the brush belts for transporting slice-shaped objects in a vertical orientation into the horizontal transport area between said bristle packets.

2. The apparatus as claimed in claim 1, wherein the shot belt assembly is located above the brush belts to feed slice-shaped objects downwardly into the area between the belts.

3. The apparatus as claimed in claim 2, wherein the shot belt assembly comprises a pair of opposing, vertically oriented transport belts working in opposite directions to transport a series of slice-shaped objects vertically downwardly into the area between the belts.

4. The apparatus as claimed in claim 2, including a rejection hatch located below said brush belts at a location opposite said shot belt assembly.

5. The apparatus as claimed in claim 1, wherein the shot belt assembly is located below the brush belts to feed slice-shaped objects upwardly into the area between the belts.

6. The apparatus as claimed in claim 1, wherein each brush belt comprises an endless belt and a pair of spaced rollers over which the endless belt extends.

7. The apparatus as claimed in claim 1, wherein each brush belt is made of synthetic material.

8. The apparatus as claimed in claim 1, wherein a plurality of spaced stop blocks are mounted on each brush belt, and the bristle packets are secured in said stop blocks.

9. The apparatus as claimed in claim 8, wherein the stop blocks are each made of synthetic material.

10. The apparatus as claimed in claim 1, including a drive assembly for driving the brush belts horizontally.

11. The apparatus as claimed in claim 1, including a pair of upper, horizontally oriented brush belts and a pair of lower, horizontally oriented brush belts defining said horizontal transport area.

12. The apparatus as claimed in claim 1, including a stopping device adjacent the outlet end of the transport area.

13. The apparatus as claimed in claim 12, wherein the stopping device comprises a pair of opposing pneumatic cylinders on opposite sides of said transport area and a series of fingers linked to said cylinders for movement between extended and retracted positions.

14. The apparatus as claimed in claim 12, including a sensor located in the area of the stopping device.

15. The apparatus as claimed in claim 1, including a stacking unit at the outlet end of said transport area, the stacking unit comprising a rotatably mounted turnstile and drive means for driving the turnstile, the turnstile having a plurality of fingers projecting radially outwardly, each finger comprising stop faces for stopping and stacking a plurality of slice-shaped objects.

16. The apparatus as claimed in claim 15, wherein each finger is at an angle of 90° to the adjacent fingers.

17. The apparatus as claimed in claim 15, including at least one transport conveyor for transporting a stack of slice-shaped objects from said turnstile.

18. The apparatus as claimed in claim 15, wherein said drive means comprises a belt drive assembly.

* * * * *